July 14, 1964 R. CREVELING 3,141,091

COUNTING CIRCUITS

Filed Aug. 23, 1961 4 Sheets-Sheet 1

ROBERT CREVELING,
INVENTOR.

BY HIS ATTORNEYS.

Spensley & Horn.

July 14, 1964 R. CREVELING 3,141,091

COUNTING CIRCUITS

Filed Aug. 23, 1961 4 Sheets-Sheet 2

ROBERT CREVELING,
INVENTOR.

BY HIS ATTORNEYS
SPENSLEY & HORN.

ROBERT CREVELING,
INVENTOR.

BY HIS ATTORNEYS.

Spensley & Horn.

COUNTING CIRCUITS

Filed Aug. 23, 1961

4 Sheets-Sheet 4

INVENTOR.
ROBERT CREVELING,
BY HIS ATTORNEYS
Spensley & Horn.

United States Patent Office 3,141,091

Patented July 14, 1964

3,141,091
COUNTING CIRCUITS

Robert Creveling, 1415 Park Ave. SW., Albuquerque, N. Mex.

Filed Aug. 23, 1961, Ser. No. 133,505
14 Claims. (Cl. 235—92)

This invention relates to counting circuits and more particularly to high speed electronic counters employing negative resistance devices.

Electronic counting circuits have wide application, being particularly useful, for example, as basic components in digital computing machines or as frequency dividers to provide time interval control in various electronic devices, to name only a few. These counting circuits generally operate to give a signal that depends upon the number of electrical pulses impressed on the system. Thus, for example, the circuit may "count" or indicate the number of pulses fed into it by assuming a different "state" each time a pulse is impressed. The state the circuit is in at any one time will accordingly indicate the number of pulses received.

In prior art counting circuits an electrical output is generally obtainable only at the last counting device in the circuit. It is desirable in some applications to provide an electrical output across each counting device in the circuit, and counters have been developed to provide this desired feature. However, the counters heretofore providing an electrical output associated with each counting device in the circuit usually employ a form of capacitive coupling between counting devices which results in spurious undesired signals.

It is therefore an object of the present invention to provide improved electrical counting circuits.

It is also an object of the present invention to provide improved electrical counting circuits for counting regular or random pulses and including means for visually and/or electrically registering the count.

It is another object of the present invention to provide improved electrical counting circuits which are self-resetting, or which can be set to a predetermined value.

It is still another object of the present invention to provide improved counting circuits which will provide a single output pulse in response to the accumulation of each predetermined number of input pulses.

It is a further object of the present invention to provide relatively simple, compact and inexpensive electrical counting circuits.

It is a still further object of the present invention to provide improved electrical counting circuits in which an output is derived from each circuit branch containing a counting device.

The objects of the present invention are accomplished by an electrical counting circuit including a plurality of multibranch counting groups, together with means for switching voltage and/or current successively to a different group in a predetermined order in response to electrical input pulses. Each of the counting groups consists of an identical plurality of circuit branches connected in parallel, each circuit branch including the series combination of an electrical isolating device and a negative resistance device. The negative resistance devices are selectively operable through a portion of the negative resistance region of their voltage-current curves between inactive and counting states. The isolating devices also serve as triggering devices and act in conjunction with the means intercoupling the counting groups to successively electrically "prime" a particular negative resistance device in a different group for operation into the counting state so that when the next voltage step (or pulse) is applied to that particular group, only the one "primed" negative resistance device in the group will count. By providing output means for each circuit branch of each counting group, various counting combinations become feasible.

The term "negative resistance device," as utilized herein, refers to an electrical component exhibiting a negative resistance characteristic within at least a portion of its operating range, wherein the voltage drop across the device decreases as the current flow through the device is increased, or vice versa. Examples of typical negative resistance devices suitable for use in the present invention are gas discharge tubes, 4-layer diodes, tunnel diodes, and vacuum tubes such as pentodes and screen grid tetrodes. Gas discharge tubes and 4-layer diodes have a conduction region where the voltage drop across the device decreases as the current through the device increases. This negative resistance characteristic is utilized in the present invention circuitry by supplying additional current to each negative resistance device when the device is to count, the additional current being provided from the D.C. supply through the switching means. In pentode vacuum tubes having their suppressor grid negatively biased, electrons that would normally pass through the suppressor to the plate are turned back to the screen, thus increasing the screen current and reversing normal tube action. In screen grid tetrodes, secondary emission occurs from the plate at certain values of screen grid voltage, thereby causing a decrease in plate current upon an increase in plate voltage. This particular negative resistance characteristic is utilized in the present invention circuitry by supplying additional voltage to each negative resistance device, when the device is to count, the additional voltage being provided from the D.C. supply through the switching means. Tunnel diodes are like tetrodes in that they can be operated in a region wherein the current decreases as the voltage is increased. In the case of tunnel diodes, either voltage or current switching may be utilized as will be hereinafter explained.

As stated hereinabove, the electrical isolating devices act in conjunction with the intercoupling means to electrically prime one particular negative resistance device at a time, so it will be the device next to count. For example, a gas discharge tube and 4-layer diode negative resistance devices are primed by a voltage advantage over the other negative resistance devices in that counting group so that when the voltage applied to the counting group is increased, the primed device will quickly operate into its negative resistance region with the associated increase in current and decrease in voltage drop. Similarly, tunnel diodes (under certain conditions) and vacuum tubes are primed by a current advantage over the other negative resistance devices in that counting group. The priming of a negative resistance device by providing it with an electrical advantage over other negative resistance devices in the same counting group is enabled by the presence of an isolating device in each circuit branch of the group. The term "electrical isolating device," as utilized herein, refers basically to an electrical component presenting a high impedance, thereby providing effective decoupling of each negative resistance device from the source of D.C. supply voltage and permitting different voltage drops to exist across different negative resistance devices. However, when utilizing negative resistance devices such as gas discharge tubes and 4-layer diodes which possess a negative resistance characteristic wherein an increase in current through the device results in a decrease in the voltage drop across the device, it is seen that the use of a resistor as the electrical isolating device would be impractical because of its current-limiting effect when the associated negative resistance device is in a counting state. Hence, the electrical isolating devices utilized with such current-switching negative resistance devices should present a high impedance to provide the proper isolation when the associated negative resistance device is in the inactive state, and present a low impedance to the heavy current flow therethrough when the negative resistance device is in the counting state. Examples of electrical isolating devices providing this additional desirable characteristic are semiconductor diodes and cold cathode gas discharge tubes.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 1:
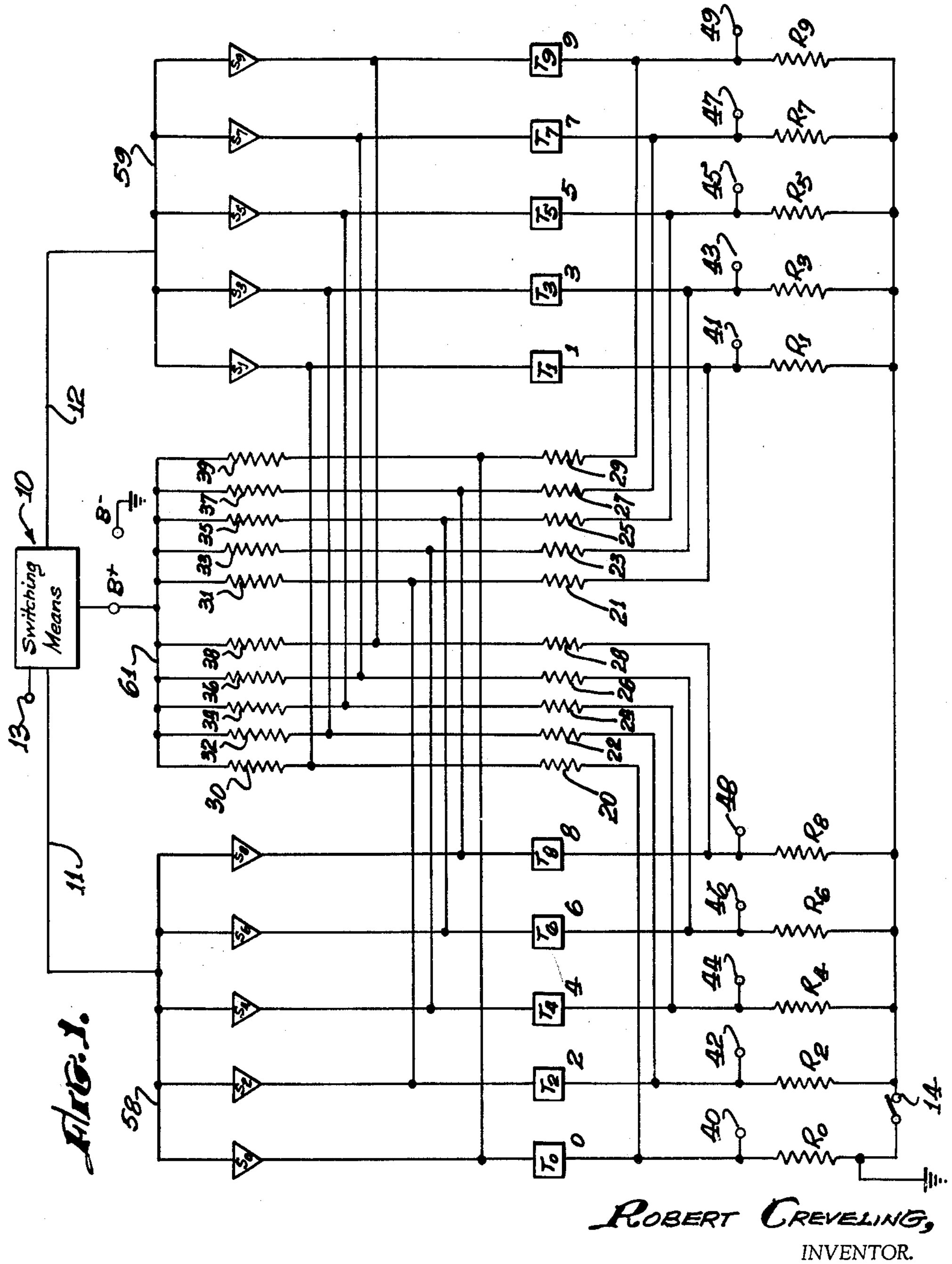
FIGURE 1 is a general schematic diagram showing the basic form of a counting circuit for gas discharge tube and 4-layer diode type negative resistance devices.

Referring now to the drawing, in FIGURE 1 there is shown the basic form of a circuit for a decade count utilizing negative resistance devices wherein an increase in current flow through the device results in a decrease in the voltage drop across the device. The basic form consists of two counting groups, each counting group including five identical parallel circuit branches. Each circuit branch consists of an electrical isolating device (S), a negative resistance device (T), and a load resistance (R). The components in the five circuit branches of the first counting group are identified by the numerical subscripts 0, 2, 4, 6 and 8, respectively, and the components of the five circuit branches of the second counting group are identified by the numerical subscripts 1, 3, 5, 7 and 9, respectively. The switching means, generally indicated by the reference numeral 10, is connected to the first counting group by an electrical lead 11 and to the second counting group by an electrical lead 12. A source of direct current potential, not shown, is connected between the terminals labeled B+ and B−. The switching means 10 is connected to the B+ terminal and is adapted to derive operating voltages therefrom for each of the two counting groups. The switching means 10 is also adapted to receive a series of trigger pulses applied to an input terminal 13 and to apply the pulses simultaneously to each of the counting groups and to alternately alter the energy supplied to the first and second counting groups through the electrical leads 11 and 12 in a manner to be hereinafter explained. The circuit branches of the first and second counting groups are interconnected by a series of resistance dividing networks including resistors 20 through 39. One resistance dividing network consists of the series combination of resistor 30, resistor 20, and the load resistor $R_0$; another resistance dividing network consisting of the series combination of resistor 32, resistor 22 and the load resistor $R_2$; et cetera. The resistance dividing network consisting of the series combination of resistor 30, resistor 20, and the load resistor $R_0$ is connected directly across the source of D.C. potential, while the remaining resistance divider networks are returned to the B− common terminal via a reset switch 14. The electrical circuit branches of the counting groups are resistance coupled in the following manner: the junction between the electrical isolating device and the negative resistance device of the first circuit branch of one counting group is electrically coupled to the junction between the negative resistance device and the load resistor of the last circuit branch of the other counting group; the junction between the electrical isolating device and the negative resistance device of the Xth circuit branch of one counting group is electrically coupled to the junction between the negative resistance device and the load resistor of the $(X-1)$th circuit branch of the other counting group; and, the junction between the negative resistance device and the load resistor of the Xth circuit branch in one counting group is electrically coupled to the junction between the electrical isolating device and the negative resistance device of the Xth circuit branch of the other counting group.

In order to facilitate selective operation of the negative resistance devices to the negative resistance portion of their characteristic, the devices in this current-switching embodiment are normally biased at a high voltage-low current inactive state by the resistance voltage dividing network connected across the D.C. potential source. For example, the negative resistance device $T_2$ in FIGURE 1 is normally biased in the inactive state by the voltage dividing effect of the resistors 31 and 21 and the load resistor $R_1$, together with the resistors 32 and 22 and the load resistance $R_2$. The other negative resistance devices in the group are likewise normally biased at the same potential by their associated resistance networks. Now if the negative resistance device $T_1$ is in the counting state (the circuit indicating a count of 1) the increased flow of current through the load resistor $R_1$ will cause the voltage drop appearing across that resistor to be greater than the voltage drop across the other load resistors. This increased voltage drop is coupled to the negative resistance device $T_2$ through the voltage dividing effect of the resistors 31, 21 and $R_1$ to bias the negative resistance device $T_2$ at a higher potential than any of the other negative resistance devices in the circuit, the potential still being below that required to operate the negative resistance device into the counting state. Because of electrical isolating device $S_2$ which is then in its aforementioned high impedance state, the potential may be higher than that appearing at bus 58. The negative resistance device $T_2$ is therefore "primed" to the next device to count. Upon application of a positive trigger pulse to the input terminal 13 of the switching means 10 the positive pulse is superimposed upon the D.C. potentials appearing on the electrical leads 11 and 12. The increase in potential on the electrical lead 11 is applied to the negative resistance devices in the first counting group ($T_0$, $T_2$, $T_4$, $T_6$ and $T_8$), in a manner to be hereinafter explained, through the associated electrical isolating devices which are then in their low impedance state. Since the negative resistance device $T_2$ has been primed with a voltage advantage over the other negative resistance devices in that group it will be operated to its negative resistance region, i.e., the counting state, before any of the other negative resistance devices in that group. Upon being operated to the counting state, a heavy current flows through $T_2$ together with the associated decrease in voltage drop across the device. The heavy current flow is drawn from the D.C. potential source through the internal resistance of the switching means 10 and through the electrical lead 11. The heavy flow of current through the internal resistance of the switching means 10 reduces the potential appearing at the electrical lead 11 and so prevents any of the other negative resistance devices from being operated to the counting state. The reduced voltage at the electrical lead 11 is sufficient to maintain the negative resistance device $T_2$ in the counting state since in the negative resistance region the device operates at a low voltage-high current condition. The voltage decrease appearing at the electrical lead 11 caused by operation of the negative resistance device $T_2$ to the counting state is coupled through the switching means 10, in a manner to be hereinafter explained, to the electrical lead 12. Upon the decrease in the voltage applied to the second counting group, the negative resistance device $T_1$ will no longer operate in its negative resistance region and will be returned to the inactive state.

Upon operation of the negative resistance device, $T_2$ to the counting state, the resulting increase in current flow through the load resistance $R_2$, in conjunction with the voltage dividing action of the resistors 32 and 22, will prime the negative resistance device $T_3$ to be the next device to count. Upon the subsequent operation of the negative resistance device $T_3$ to the counting state, the negative resistance device $T_4$ in the first counting group will be primed and upon receipt of each successive trigger pulse, the next succeeding negative resistance device in alternate counting groups will be operated to the counting state, the operation of the negative resistance device $T_9$ to the counting state causing the negative resistance device $T_0$ to become primed for repetition of the counting sequence. The counting circuit can be reset to zero by opening the reset switch 14, which removes the negative resistance devices $T_1$ through $T_9$ from the circuit and also disconnects the common lead of the resistance dividing network (resistors 39, 29 and load resistor $R_9$) associated with the negative resistance device $T_0$ to allow a significant increase in the potential applied to that negative resistance device to cause the device to be operated to the counting state. Each circuit branch is provided with an output terminal at the junction between the negative resistance device and the load resistance, the terminals being numbered 40–49, respectively.

Figure 2:
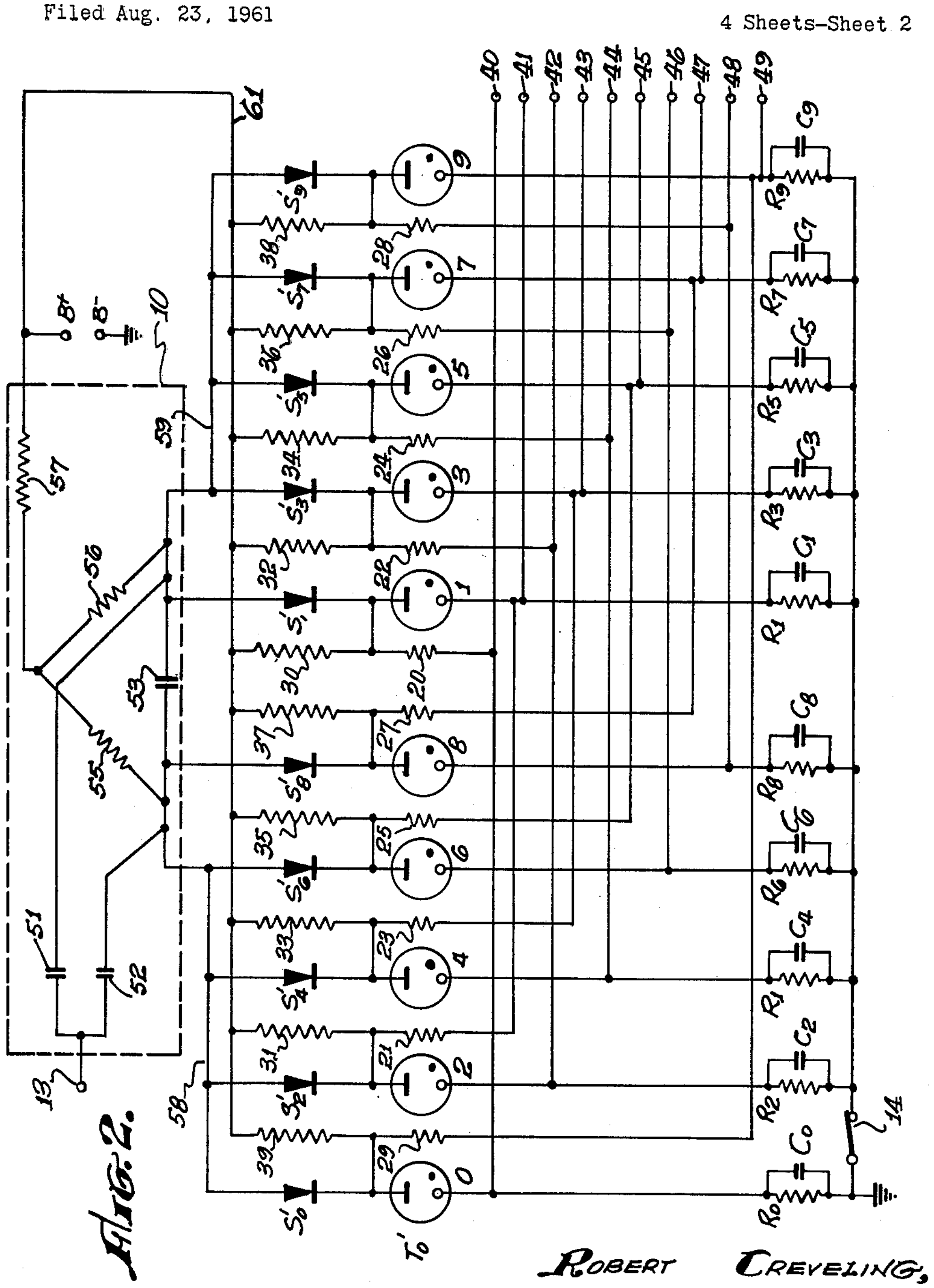
FIGURE 2 is a schematic diagram of a decade count embodiment utilizing gas discharge tubes as the negative resistance devices.

FIGURE 2 shows a schematic diagram of a specific embodiment of a decade count of the general form shown in FIGURE 1, with like reference numerals referring to like parts throughout. In this particular embodiment, semiconductor diodes are utilized as the electrical isolating devices and are designated by the reference symbols $S'_0$ through $S'_9$, and gaseous discharge tubes are utilized as the negative resistance devices $T'_0$ through $T'_9$. Gas discharge tubes particularly suitable for use as negative resistance devices are neon glow tubes, such as type NE–2, which provide the additional feature of a direct visual indication of the count. Of course, 4-layer diodes may be substituted for the gas discharge tubes, and will provide a much faster response. The circuit performs in the same manner as the circuit of FIGURE 1. In the embodiment of FIGURE 2, a suitable switching means 10 is shown within the dashed line enclosure, and consists of capacitors 51, 52 and 53, and resistors 55, 56, and 57. The trigger pulse input terminal 13 is connected to bus 58 of the first switching group by the capacitor 52, and to bus 59 of the second switching group by the capacitor 51.

The B+ terminal is connected to the bus 58 of the first counting group by a current-limiting resistor 57 and a resistor 55, and to the bus 59 of the second counting group through the current-limiting resistor 57 and a resistor 56. The B+ terminal is also connected to a bus 61 to provide voltage to the various resistance dividing networks.

In operation, with a suitable source of D.C. potential connected between the B+ and B− terminals, the reset switch 14 is opened to cause firing of the gas tube $T'_0$ and so operate it to the counting state. Conduction of the tube $T'_0$ will cause a heavy flow of current through that particular circuit branch, the forward resistance of the diode $S'_0$ being very low and the resistance of the load resistor $R_0$ being relatively low. The heavy flow of current in this circuit branch is drawn primarily through the current limiting resistor 57 and the resistor 55. The resistance of the current-limiting resistor 57 is quite high with respect to the resistance of the resistor 55 and to the resistance of the circuit branch containing the diode $S'_0$, the then conducting tube $T'_0$ and the load resistor $R_0$. Therefore, a very large voltage drop will appear across the current limiting resistor 57 to reduce the potential on the bus 58 to a value below the striking potential of the gas tubes used as the negative resistance devices, yet still sufficient to maintain conduction of a tube that has been fired. Since the potential on the bus 58 has been reduced to a value below the striking potential of the gas tubes, the other negative resistance devices in the first counting group ($T'_2$, $T'_4$, $T'_6$ and $T'_8$) are prevented from firing upon closing of the switch 14.

The increased flow of current through the load resistor $R_0$ will cause a greater voltage drop across the resistor $R_0$ than appears across the load resistors of the other circuit branches in the first counting group, the greater voltage drop across the resistor $R_0$ priming the tube $T'_1$ in the second counting group as described hereinabove with reference to FIGURE 1. Since none of the negative resistor devices in the second counting group is in the counting state, a smaller amount of current is drawn by the second counting group than is then drawn by the first counting group. Hence, the potential of the bus 59 will be higher than the potential of the bus 58. Due to the low forward resistance of the semiconductor diodes used as electrical isolating devices, the potential of the bus 59 will essentially be the potential applied to the negative resistance devices of the second counting group, with the exception of the primed device $T'_1$. The potential applied to the tube $T'_1$ can be higher than that applied to the other negative resistance devices in the second counting group, and hence higher than the potential of the bus 59, because of the high reverse resistance of the semiconductor diode utilized as the electrical isolating device $S'_1$.

The circuit will remain in the above described condition with tube $T'_0$ in the counting state and the tube $T'_1$ in the primed inactive state until application of a trigger pulse to the input terminal 13. Upon application of a trigger pulse to the input terminal 13, the pulse will be applied to both the first and second counting groups through the coupling capacitors 52 and 51 respectively. The trigger pulse will be applied to all of the tubes $T'_0$–$T'_9$ through the internal capacitance of the diodes $S'_0$–$S'_9$. Since at the time of application of the pulse, the voltage on the bus 58 is relatively low, due to the large voltage drop across the current-limiting resistor 57 and the voltage drop across the resistor 55, none of the tubes in the first counting group will fire since the voltage on the bus 58 will not increase to the firing potential of the gas tubes. The capacitance of the capacitor 52 is relatively low, and hence the energy supplied by the trigger pulse will be primarily absorbed as an increase in current through the tube $T'_0$, and the potential of bus 58 will not be raised by any significant amount. However, the capacitor 52 will receive a charge which will assist in extinguishing the tube $T'_0$ upon completion of the trigger pulse. The trigger pulse is also applied to the bus 59 through the capacitor 51 and due to the relatively higher voltage on the bus 59, the application of the trigger pulse to the bus 59 will enable firing of the tube $T'_1$ due to its primed condition resulting from its aforementioned voltage handicap. Upon conduction of the tube $T'_1$ the resulting heavy flow of current through the current-limiting resistor 57 and the resistor 56 will cause a reduction in the potential of the bus 59 and so prevent the other tubes in the second counting group from firing while still maintained a sufficient operating potential across the tube $T'_1$. The sudden voltage drop of the bus 59, caused by conduction of the tube $T'_1$, is coupled to the bus 58 through the switching capacitor 53, thereby momentarily lowering the potential of the bus 58 and causing the tube $T'_0$ to be extinguished. Again, the heavy flow of current through the conducting tube ($T'_1$) will prime the next tube in the other counting group (tube $T'_2$ in the first counting group). The circuit will remain in this condition until another trigger pulse is impressed on the input terminal 13.

It will be noted that in the embodiment of FIGURE 2 the load resistors R are shunted by load capacitors C. The load capacitors enable proper circuit action upon receipt of negative trigger pulses. A negative trigger pulse of proper magnitude and duration to extinguish a conducting tube may then be used to advance the count. During periods of tube conduction the associated load capacitance is charged and a voltage stored therein. Upon extinguishment of the tube by a negative trigger pulse another tube will not immediately fire because of the reduced bus potential. However, upon completion of the negative trigger pulse the bus potential will return to normal and another tube will still be primed with the voltage stored in the load capacitance of the previously conducting tube. Hence, when the voltage across the circuit recovers sufficiently, the primed tube will conduct at the expense of the other tubes.

In a specific illustrative embodiment of the circuitry of FIGURE 2, type NE–2 neon bulbs are used as the negative resistance devices and semiconductor diodes as the electrical isolating devices. The break-down voltage of the NE–2 neon tubes is approximately 75 volts and the nominal operating voltage of these tubes is about 57 volts. The D.C. supply potential is 320 volts and the resistance of the load resistors R is 200K. The load capacitors C are 0.01 mfd. The resistance of the resistors 30–39 is 44 megohms, and of the resistors 20–29, 11 megohms. The resistance of the current-limiting resistor 57 is 5 megohms, and the resistors 55 and 56 are each 100,000 ohms. The capacitors 51 and 52 are each 100 mmfd. and the capacitor 53 is 1,000 mmfd. In operation with tube $T'_0$ in the counting state (and tube $T'_1$ in the inactive primed state) the potential of the bus 58 is 66.5 volts and the potential of the bus 59 is 69.5 volts. The D.C. voltage appearing at the output terminal 40 (the voltage drop across the load resistor $R_0$) is 9 volts, and the voltage at the rest of the output terminals is 1 volt. The potential appearing at the junction between the diode $S'_0$ and the tube $T'_0$ is 66 volts, and the potential appearing at the similar junction of the other circuit branches in the first counting group is 67 volts. Due to the priming effect of the tube $T'_1$ the potential appearing at the junction between the diode $S'_1$ and the tube $T'_1$ is 73 volts and the potential appearing at the similar junctions of the other circuit branches of the second counting group is 69 volts. Approximately 50 microamperes of current is drawn through the current-limiting resistor 57, 10 microamperes passing through the resistor 56 and 40 microamperes passing through the resistor 55 with the circuit in the above-described condition.

Figure 3:
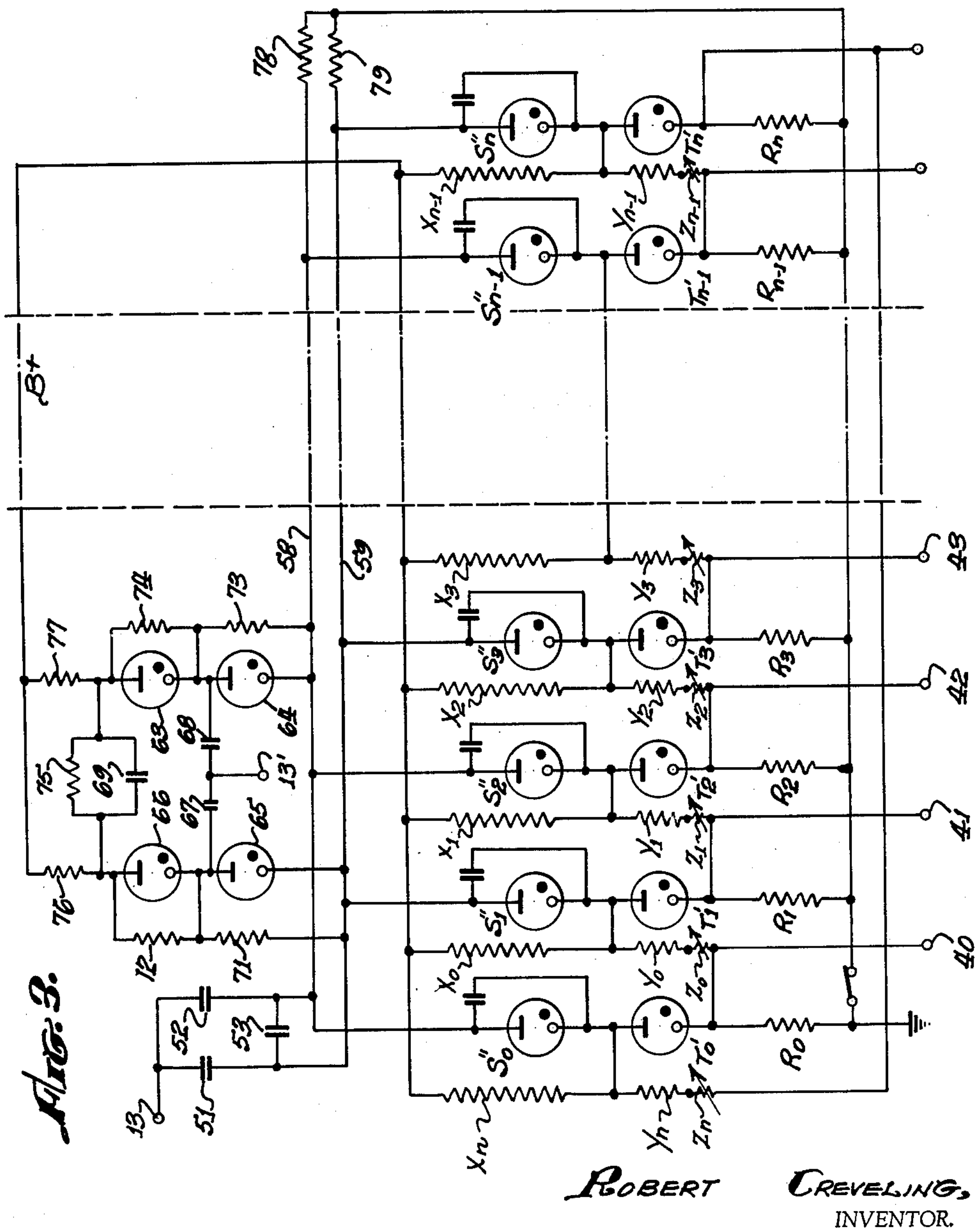
FIGURE 3 is a schematic diagram of a counting circuit which may be extended to any multiple of two count and where gas discharge tubes are utilized as the isolating devices as well as the negative resistance devices.

In FIGURE 3 there is shown a circuit arrangement capable of extension to *n* circuit branches comprising any multiple of two count, and utilizing gas discharge tubes shunted by capacitors as the electrical isolating devices. This particular type of electrical isolating device is identified by the reference symbol S″, and in the circuit of FIGURE 3 the isolating devices are designated $S''_0$ through $S''_n$. The addition of a shunt capacitor to a gas discharge tube used as an electrical isolating device in the present invention circuitry is necessary since the internal capacitance of the normally used gas discharge tube is insufficient to pass transient voltage pulses of the type utilized for triggering. In the non-conducting state a gas tube presents a very high resistance, while in the conducting state it presents a low resistance. Hence, the gas tubes used as the electrical isolators in the circuit of FIGURE 3 function in the same manner as the diodes used as the isolating devices in the circuit of FIGURE 2.

The interconnection between the individual circuit branches and the resistance dividing networks of the circuit of FIGURE 3 are of the general form of the networks of FIGURES 1 and 2. The series of resistors in FIGURE 3 designated by the symbol X together with a subscript corresponds to the series of resistors in FIGURES 1 and 2 designated by numerals in the 30's and the series of resistors in FIGURE 3 designated by the symbol Y together with a subscript corresponds to the series of resistors in FIGURES 1 and 2 designated by numerals in the 20's. More specifically, the resistor $X_2$ in FIGURE 3 corresponds to the resistor 32 in FIGURES 1 and 2, the resistor $Y_3$ to the resistor 23, etc. The circuit of FIGURE 3 also includes a variable resistor in each of the resistance dividing networks to enable compensating adjustments for differences in tube firing potentials and magnitude of the triggering pulses. These variable resistors are designated by the reference symbols $Z_0$ through $Z_n$.

In the particular embodiment of FIGURE 3 two alternative switching means are provided. The capacitance coupled switching means of FIGURE 2, including capacitors 51, 52 and 53, is shown coupling the input terminal 13 to the switching groups. An alternative input terminal 13′ is coupled to the buses 58 and 59 through a flip-flop circuit. The flip-flop switching circuit includes gas discharge tubes 63–66, capacitors 67–69, and resistors 71–79, together with the capacitor 53. Upon application of a positive or negative input pulse to the alternative input terminal 13′ the pulse is coupled to the tubes 63–66 through the relatively small capacitors 67 and 68. The output signals to the buses 58 and 59 are derived across the resistors 78 and 79, respectively.

In the operation of the gas tube flip-flop circuit, assume tubes 63 and 64 are conducting. The potential on bus 58 will be relatively high due to the voltage drop across the resistor 78. This voltage drop will also appear across the capacitor 53, the potential on bus 59 being relatively low. Now when a positive trigger pulse of sufficient magnitude is injected at the alternative input terminal 13′, the pulse will fire the tube 65 which in turn fires tube 66. The resulting current flow therethrough will raise the voltage on bus 59 due to the discharge across the resistor 79. This increased voltage will immediately be communicated through the capacitor 53 to the cathode of the tube 64 since the voltage across the capacitor 53 cannot instantaneously change. Tubes 64 and 63 will then be extinguished, thereby resulting in a transfer of current from tubes 64 and 63 to tubes 65 and 66. At this time both of the tubes 65 and 66 will be conducting while the tubes 63 and 64 are cut off.

Receipt of the next positive pulse will not affect the conducting tubes 66 and 65 but will fire the tubes 64, again causing the tubes 65 and 66 to be extinguished by the voltage drop across the capacitor 53. Thus, the circuit flips or flops with each successive trigger pulse and provides alternately high and low potentials on the buses 58 and 59. A negative input pulse will produce much the same results except the upper tubes 63 and 66 will first fire to initiate the flip-flop action. Note that the use of the flip-flop switching device enables proper circuit operation with negative trigger pulses without the necessity of shunting the load resistors with capacitors since positive pulses will be applied to the counting groups.

The circuit of FIGURE 4 again follows the general format of the circuit of FIGURE 1, this circuit utilizing tunnel diodes to enable an extremely rapid counting rate. The reference symbol T'' is utilized to designate a tunnel diode type of negative resistance device. In this embodiment capacitive intercoupling is utilized instead of resistance coupling, due to the negative resistance characteristic of the tunnel diodes. Intercoupling is provided by capacitors 81–90. Diodes of a low forward voltage drop (uni-diode) are utilized as the electrical isolating devices $S'_0$–$S'_9$; however, under ideal conditions resistors may be used to provide the necessary isolation of one counting device from the others. The circuit of FIGURE 4 can operate in various modes depending upon the current and voltage supplied by the switching means 10. The embodiment of the switching means 10 shown in FIGURE 2 is presently preferred because of its rapid operation.

One possible mode of operation is to operate all but one tunnel diode at the low or valley current and a corresponding high voltage point associated with this low valley current, resistors being utilized as the electrical isolating devices instead of the shown diodes. The one high current conducting tunnel diode is operated just below the peak current and a low potential, namely, the peak voltage. The load resistance of the heavily conducting tunnel diode will have a relatively large voltage drop across it as compared with the other load resistances. This higher voltage is utilized to indicate the count in this embodiment since no visible indication is given as with gas discharge tubes. In addition, the voltage drop across the load resistance of the conducting tunnel diode is utilized to transfer the count in a manner to now be explained. All of the tunnel diodes stabilized at the valley current are subject to shifting to near the peak current if the current therethrough is decreased sufficiently and a proper load resistance is utilized. The resulting decrease in current will be passed on to the next tunnel diode to count when the counting tunnel diode is "pushed" over the peak current "hill" by an increase in current supplied by the switching means as the count is progressed. A corresponding increase in current (or voltage) of the other tunnel diodes will not shift their operating points. Upon collapse of the output voltage appearing across the load resistance associated with the counting tunnel diode the resulting negative voltage step is impressed on the next succeeding tunnel diode by the associated coupling capacitor to cause the next tunnel diode to shift past the valley current position and on up to the stable point near the peak current. This increase in current is manifested by an increase in voltage across the associated load resistor, thereby producing an output signal to indicate the new count.

Thus, assuming tunnel diode $T''_0$ to be in the counting state, a relatively large voltage will appear across the load resistance $R_0$ due to the heavy current flow therethrough, the count then registering "zero." Upon application of a proper trigger pulse to the diode $T''_0$ it will be pushed over the peak current hill to the stable low (valley) current condition. The abrupt decrease in current flow through the load resistance $R_0$ will cause a negative voltage step which is applied to the tunnel diode $T''_1$ through the coupling capacitor 90 to cause an abrupt decrease in current through diode $T''_1$ thereby causing it to shift to a stable point near the peak current. The heavy flow of current through the diode $T''_1$ will cause a large voltage drop across its load resistance $R_1$, thereby registering a count of "one." Note that, unlike the embodiments of FIGURES 1 through 3, the trigger pulse directly shuts off the previously counting negative resistance device and the abrupt decrease in current flow of that particular circuit branch serves to switch on the next device to count, no prior priming of the next device having occurred.

Another possible mode of operation is the reverse of that just explained, wherein all of the tunnel diodes except one are operated just below the peak current, a relatively large voltage drop appearing across their respective load resistors. The remaining counting tunnel diode is operated in the valley current (low current) condition. If the current supplied the diodes is decreased slightly when the count is to be advanced, the counting tunnel diode will shift to near the peak current point of stability, the resulting increase in the voltage drop across the output resistor being transferred to the next tunnel diode to count via the proper interconnecting capacitors. The increase in current is that required to "push" the current over the "hill' to a low and stable point near the valley current minimum. The low output voltage is an indication of the count in this particular mode of operation.

Figures 4, 5:
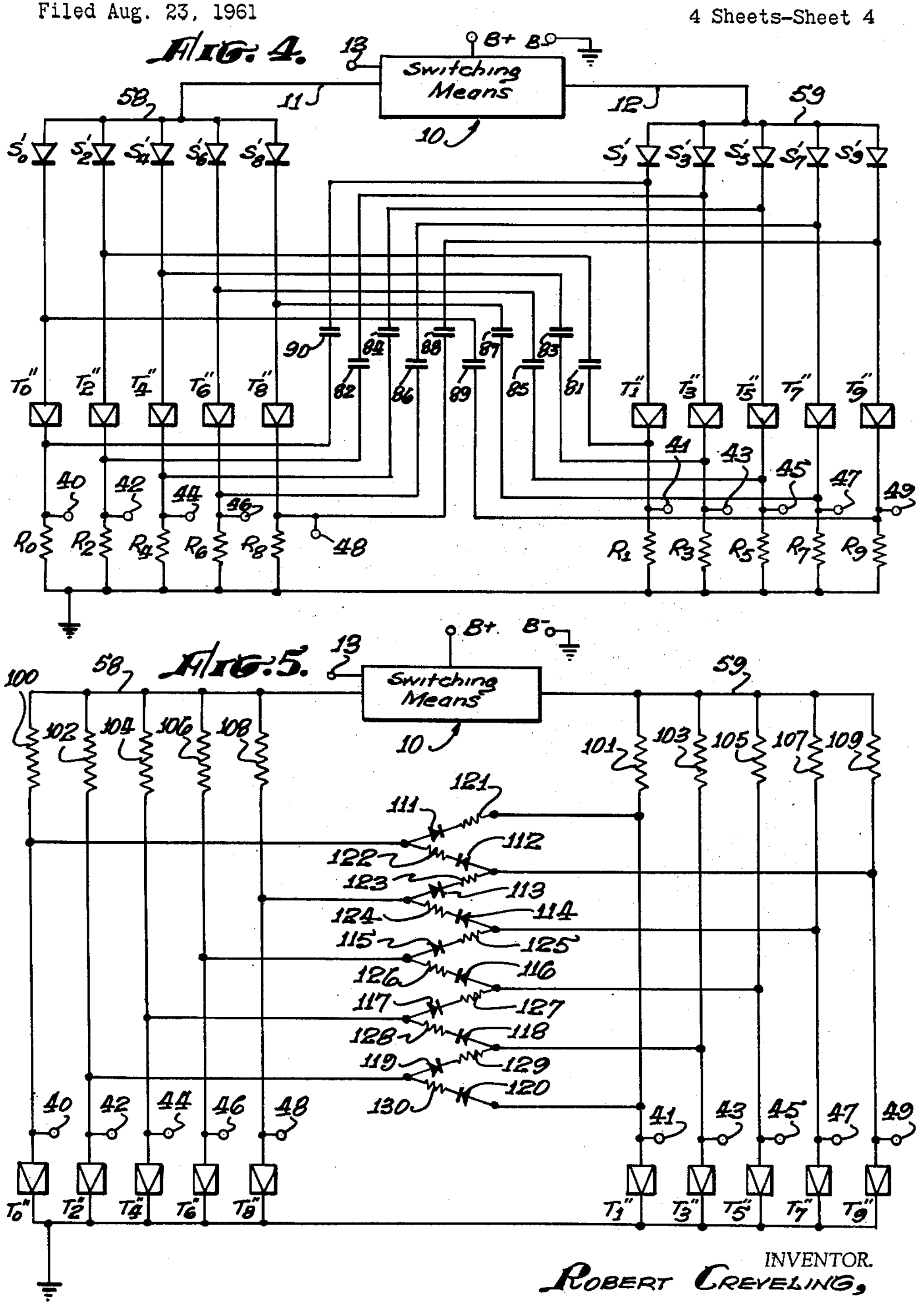
FIGURE 4 is a schematic diagram of a decade embodiment of a counting circuit utilizing tunnel diodes as the negative resistance devices; and, FIGURE 5 is a schematic diagram of an alternative embodiment of a tunnel diode counting device wherein a resistance-rectifier ring is used to interconnect the counting groups.

The circuit of FIGURE 4 will also operate without a switching means, the trigger pulses being applied directly to the counting groups. The tunnel diodes may be arranged in a ring and any number used. Thus, a count of five operated together with a binary counting unit may become a decade counter or a "bi-quint" combination. A suitable decoding device may be used to indicate the count.

Another circuit intended for the use of tunnel diodes is shown in FIGURE 5. The circuit of FIGURE 5 is of the same general form as that of FIGURE 1, with the parallel circuit branches of the switching groups consisting of the series combination of a resistor and a tunnel diode. The resistances 100 through 109 act as de-coupling devices to electrically isolate the tunnel diodes used as the negative resistance devices. Intercoupling between the circuit branches is in the form of a resistance-diode ring including resistors 121 through 130 and diodes 111 through 120. The coupling diodes 111–120 are employed to determine the desired counting direction and the individual outputs are taken across the tunnel diodes themselves.

In one mode of operation all of the tunnel diodes except the counting one are operated at a point somewhat below the peak current, while the counting diode is operating in the valley current region with a relatively high voltage drop (approximately that of the valley voltage) across it. For example, consider tunnel diode $T''_0$ to be in a counting (low current) state. The voltage drop across the tunnel diode $T''_0$ will be impressed across the series combination of coupling diode 111, resistor 121, and tunnel diode $T''_1$ to put it nearer the peak current point of instability than the other tunnel diodes. In this manner the tunnel diode next to count ($T''_1$) is primed with current. When the count is to be advanced the switching means 10 will furnish enough additional current to push only tunnel diode $T_1$ over the hill and into the valley or low current, high voltage condition. The other tunnel diodes, having a greater current requirement, will not be switched. The switching means will subsequently reduce the voltage enough to switch the previously counting tunnel diode, $T''_0$, to the high current or low voltage region somewhat below the peak current point. The voltage across the new counting tunnel diode, $T''_1$, is then available to contribute additional current to the device next to count, tunnel diode $T''_2$. Hence, the receipt of the next pulse from the switching means will again advance the count.

Another mode of operation for the device of FIGURE 5 could be effected by operating all but one tunnel diode in the low valley current condition (high valley voltage). The counting diode would be operated near the peak current (low peak voltage). The low voltage will cause a decrease in the current of the tunnel diode next to count and thus permit it to switch to the near peak current condition when the switching means reduces the current enough to effect only that one counting device. Thus, the electrical advantage with which the primed tunnel diode is provided is a current which is less than the current drawn by the other tunnel diodes in that counting group. The switching means meanwhile is increasing the voltage (and current) on the counting tunnel diode along with the others in the same switching group and thus cause it also to be shifted to the valley current condition. An output signal in this mode of operation appears as a lower voltage drop across the counting tunnel diode in contrast with the high voltage drop across the others. If the voltage drops are compared with voltages of the order of the majority, a signal will be associated with the low voltage or counting tunnel diode. The lower-than-majority signal voltage may be detected and/or displayed by suitable means. The particular priming action in this second mode of operation of the device of FIGURE 5 results in a counting direction opposite to that indicated in the figure. Hence, the circuit of FIGURE 5 can be used either to add or subtract, depending upon its mode of operation.

Thus there has been described various embodiments of improved electronic counting circuits employing negative resistance devices as the counting elements. Although the invention has been described with a certain degree of particularity, it is understood that the present disclosure has been made only by way of example and that numerous changes in the details of the circuitry and the combination and arrangement of components may be resorted to without departing from the spirit and the scope of the invention as hereinafter claimed. For example, although the illustrative embodiments emphasized the use of two counting groups in a decade the basic circuitry may be adapted to the use of any number of counting groups, and of course is not limited to a decade count.

What is claimed is:

1. A pulse counting circuit comprising, in combination: a predetermined plurality of counting groups, each of said counting groups consisting of a predetermined plurality of substantially identical circuit branches connected in parallel, each of said circuit branches consisting of a series combination of an electrical isolating device and a two-terminal negative resistance device and a load impedance, said negative resistance devices exhibiting a negative resistance characteristic over a portion of their operating range wherein an increase in current flow through the device results in a decrease in the voltage drop across the device, said negative resistance devices being selectively operable through a portion of the negative resistance region of their voltage current curves between inactive and counting states, each of said counting groups being coupled to a source of direct-current operating potential, the electrical energy supplied to said counting groups from said source of direct current operating potential normally biasing all except one of said negative resistance devices in the counting circuit in the inactive state, the remaining negative resistance device being biased in the counting state; direct-current coupling means intercoupling the negative resistance devices of said circuit branches in a counting ring wherein the count progresses successively from group to group in a predetermined order, the junction between the negative resistance device and the load impedance of the Xth circuit branch of one group being coupled to the junction between the electrical isolating device and the negative resistance device of the Xth circuit branch of the next group with the exception that the junction between the negative resistance device and the load impedance of the Xth circuit branch of the last group is coupled to the junction between the electrical isolating device and the negative resistance device of the $(X+1)$th circuit branch of the first group and with the further exception that the junction between the negative resistance device and the load impedance of the last circuit branch of the last group is coupled to the junction between the electrical isolating device and the negative resistance device of the first circuit branch of the first group, where X is a positive integer not in excess of said predetermined number of circuit branches, the direct-current potential drop appearing across the load impedance in the circuit branch containing the negative resistance device in the counting state being coupled to the next negative resistance device to count to prime it with a voltage advantage whereby upon application of a predetermined electrical input pulse to the counting groups the primed negative resistance device will be selectively switched from the inactive state to the counting state; and, switching means coupling each of said counting groups to said source of direct-current operating potential, said switching means being responsive to each pulse to be counted by applying a said predetermined electrical input pulse simultaneously to each of said counting groups to thereby cause advancement of the count and by selectively altering the electrical energy supplied to the counting group containing the negative resistance device just switched to the counting state to maintain that particular count until application of the next succeeding predetermined electrical input pulse, said switching means further intercoupling said counting groups to momentarily couple said alteration in electrical energy occurring upon advancement of the count to the counting group containing the negative resistance device indicating the immediately preceding count to selectively switch that negative resistance device from the counting state to the inactive state.

2. A pulse counting circuit comprising, in combination: a predetermined plurality of counting groups, each of said counting groups consisting of a predetermined plurality of substantially identical circuit branches connected in parallel, each of said circuit branches comprising a series combination of an electrical isolating device and a two-terminal negative resistance device, said negative resistance devices exhibiting a negative resistance characteristic over a portion of their operating range wherein an increase in the voltage across the device results in a decrease in current flow through the device, said negative resistance devices being selectively operable through a portion of the negative resistance region of their voltage-current curves between inactive and counting states, each of said counting groups being coupled to a source of direct-current operating potential, the electrical energy supplied to said counting groups from said source of direct-current operating potential normally biasing all, except one of said negative resistances in the counting circuit in the inactive state, the remaining negative resistance device being biased in the counting state; direct-current coupling means intercoupling the negative resistance devices of said circuit branches in a counting ring wherein the count progresses successively from group to group in a predetermined order, the Xth circuit branch of one group being coupled to the Xth circuit branch of the next group with the exception that the Xth circuit branch of the last group is coupled to the $(X+1)$th circuit branch of the first group and with the further exception that the last circuit branch of the last group is coupled to the first circuit branch of the first group, where X is a positive integer not in excess of the number of circuit branches in a counting group, said electrical coupling means priming the next negative resistance device to count with an electrical advantage whereby upon application of a predetermined electrical input pulse to the counting groups the primed negative resistance device will be selectively switched from the inactive state to the counting state; and, switching means couping each of the counting groups to said source of direct-current operating potential, said switching means being responsive to each pulse to be counted by applying a said predetermined electrical input pulse simutaneously to each of said counting groups to thereby cause advancement of the count and by selectively altering the electrical energy supplied to the counting group containing the negative resistance device just switched to the counting state to maintain that particular count until application of the next succeding predetermined electrical input pulse, said switching means further intercoupling said counting groups to momentarily couple said alteration in electrical energy occurring upon advancement of the count to the counting group containing the negative resistance device indicating the immediately preceding count to selectively switch that negative resistance device from the counting state to the inactive state.

3. A pulse counting circuit comprising, in combination: a predetermined plurality of counting groups, each of said counting groups consisting of a predetermined plurality of substantially identical circuit branches connected in parallel, each of said circuit branches consisting of a series combination of an electrical isolating device and a two-terminal negative resistance device and a load impedance, said negative resistance devices exhibiting a negative resistance characteristic over a portion of their operating range wherein an increase in current flow through the device results in a decrease in the voltage drop across the device, said negative resistance devices being selectively operable through a portion of the negative resistance region of their voltage-current curves between inactive and counting states, each of said counting groups being coupled to a source of direct-current operating potential, the electrical energy supplied to said counting groups from said source of direct-current operating potential normally biasing all except one of said negative resistance devices in the counting circuit in the inactive state, the remaining negative resistance device being biased in the counting state; direct-current coupling means intercoupling the negative resistance devices of said circuit branches in a counting ring wherein the count progresses successively from group to group in a predetermined order, the junction between the negative resistance device and the load impedance of the Xth circuit branch of one group being resistively coupled to the junction between the electrical isolating device and the negative resistance device of the Xth circuit branch of the next group with the exception that the junction between the negative resistance device and the load impedance of the Xth circuit branch of the last group is resistively coupled to the junction between the electrical isolating device and the negative resistance device of the $(X+1)$th circuit branch of the first group and with the further exception that the junction between the negative resistance device and the load impedance of the last circuit branch of the last group is resistively coupled to the junction between the electrical isolating device and the negative resistance device of the first circuit branch of the first group, where X is a positive integer not in excess of said predetermined number of circuit branches, the potential drop appearing across the load impedance in the circuit branch containing the negative resistance device in the counting state being coupled to the next negative resistance device to count to prime it with a voltage advantage whereby upon application of a predetermined electrical input pulse to the counting groups the primed negative resistance device will be selectively switched from the inactive state to the counting state; and, switching means coupling each of the counting groups to said source of direct-current operating potential, said switching means being responsive to each pulse to be counted by applying a said predetermined electrical input pulse simultaneously to each of said counting groups to thereby cause advancement of the count and by selectively altering the electrical energy supplied to the counting group containing the negative resistance device just switched to the counting state to maintain that particular count until application of the next succeeding predetermined electrical input pulse, said switching means capactively intercoupling said counting groups to momentarily apply said alteration in electrical energy occurring upon advancement of the count to the counting group containing the negative resistance device indicating the immediately preceding count to selectively switch that negative resistance device from the counting state to the inactive state.

4. A pulse counting circuit as defined in claim 3, wherein said electrical isolating devices are semiconductor diodes and wherein said negative resistance devices are gas discharge tubes.

5. A pulse counting circuit as defined in claim 3, wherein said electrical isolating devices are gas discharge tubes shunted by capacitors and wherein said negative resistance devices are gas discharge tubes.

6. A pulse counting circuit as defined in claim 3, wherein said electrical isolating devices are semiconductor diodes and where said negative resistance devices are 4-layer diodes.

7. A pulse counting circuit as defined in claim 3, wherein said electrical isolating devices are semiconductor diodes, wherein said negative resistance devices are gas discharge tubes, and wherein each of said load impedances is the parallel combination of a resistor and a capacitor.

8. A pulse counting circuit as defined in claim 3, wherein said electrical isolating devices are gas discharge tubes shunted by capacitors, wherein said negative resistance devices are gas discharge tubes, and wherein said load impedances are resistors.

9. A pulse counting circuit as defined in claim 2, wherein said electrical isolating devices are semiconductor diodes and wherein said negative resistance devices are tunnel diodes.

10. A pulse counting circuit as defined in claim 2, wherein said electrical isolating devices are resistors and wherein said negative resistance devices are tunnel diodes.

11. A pulse counting circuit comprising, in combination: a plurality of counting groups, each group consisting of a plurality of circuit branches connected in parallel, each circuit branch including the series combination of an electrical isolating device and a two-terminal negative resistance device, said negative resistance devices being electrically operable through a portion of the negative resistance region of their voltage-current curves between inactive and counting states, each of said counting groups being coupled to a source of direct-current operating potential, the electrical energy supplied to said counting groups from said source of direct-current operating potential normally biasing all except one of said negative resistance devices in the counting circuit in the inactive state, the remaining negative resistance device being biased in the counting state; direct-current coupling means connected to the junction between the electrical isolating device and the negative resistance device of each of said circuit branches to intercouple the circuit branches in a counting ring wherein the count progresses successively from group to group in a predetermined order, said electrical coupling means priming the next negative resistance device to count with an electrical advantage so that upon application of a predetermined electrical input pulse to the counting groups the primed negative resistance device will be selectively switched from the inactive state to the counting state; and, switching means coupling each of the counting groups to said source of direct-current operating potential, said switching means being responsive to each pulse to be counted by applying a said predetermined electrical input pulse simultaneously to each of said counting groups to thereby cause advancement of the count and by selectively altering the electrical energy supplied to the counting group containing the negative resistance device just switched to the counting state to maintain that particular count until application of the next succeeding predetermined electrical input pulse, said switching means further intercoupling said counting groups to momentarily couple said alteration in electrical energy occurring upon advancement of the count to the counting group containing the negative resistance device indicating the immediately preceding count to selectively switch that negative resistance device from the counting state to the inactive state.

12. A pulse counting circuit comprising, in combination: a plurality of counting groups, each group consisting of a plurality of circuit branches connected in parallel, each circuit branch including the series combination of an electrical isolating device and a two-terminal negative resistance device, said negative resistance devices being electrically operable through a portion of the negative resistance region of their voltage-current curves between inactive and counting states, each of said counting groups being coupled to a source of direct-current operating potential, the electrical energy supplied to said counting groups from said source of direct-current operating potential normally biasing all except one of said negative resistance devices in the counting circuit in the inactive state, the remaining negative resistance device being biased in the counting state; direct-current coupling means intercoupling said circuit branches in a counting ring wherein the count progresses successively from group to group in a predetermined order, the count advancing from the Xth circuit branch in one group to the Xth circuit branch in the next group with the exception that the count advances from the Xth circuit branch in the last group to the $(X+1)$th circuit branch of the first group and with the further exception that the count advances from the last circuit branch of the last group to the first circuit branch of the first group, where X is a positive integer not in excess of said predetermined number of circuit branches, said electrical coupling means priming the next negative resistance device to count with an electrical advantage so that upon application of a predetermined electrical input pulse to the counting groups the primed negative resistance device will be selectively switched from the inactive state to the counting state; and, switching means coupling each of the counting groups to said source of direct-current operating potential, said switching means being responsive to each pulse to be counted by applying a said predetermined electrical input pulse simultaneously to each of said counting groups to thereby cause advancement of the count and by selectively altering the electrical energy supplied to the counting group containing the negative resistance device just switched to the counting state to maintain that particular count until application of the next succeeding predetermined electrical input pulse, said switching means further intercoupling said counting groups to momentarily couple said alteration in electrical energy occurring upon advancement of the count to the counting group containing the negative resistance device indicating the immediately preceding count to selectively switch that negative resistance device from the counting state to the inactive state.

13. A pulse counting circuit comprising, in combination: a plurality of counting groups, each group consisting of a plurality of circuit branches connected in parallel, each circuit branch comprising an identical series combination of an electrical isolating device and a tunnel diode, said tunnel diodes being electrically operable through a portion of the negative resistance region of their voltage-current curves between inactive and counting states, each of said counting groups being coupled to a source of direct-current operating potential, the electrical energy supplied to said counting groups from said source of direct-current operating potential normally biasing all except one of said tunnel diodes in the counting circuit in the inactive state, the remaining tunnel diode being biased in the counting state; electrical coupling means connected to the junction between the electrical isolating device and the tunnel diode of each of said circuit branches to intercouple said circuit branches in a counting ring wherein the count progresses successively from group to group in a predetermined order, the junction between the electrical isolating device and the tunnel diode of the Xth circuit branch of one group being coupled to the junction between the electrical isolating device and the tunnel diode of the Xth circuit branch of the next group, the junction between the electrical isolating device and the tunnel diode of the Xth circuit branch of the last group being coupled to the junction between the electrical isolating device and the tunnel diode of the $(X+1)$th circuit branch of the first group, said electrical coupling means priming the next tunnel diode to count with an electrical advantage whereby upon application of a predetermined electrical input pulse to the counting groups the primed tunnel diode will be selectively switched from the inactive state to the counting state; and, switching means coupling each of the counting groups to said source of direct-current operating potential, said switching means being responsive to each pulse to be counted by applying a said predetermined electrical input pulse simultaneously to each of said counting groups to thereby cause advancement of the count and by selectively altering the electrical energy supplied to the counting group containing the tunnel diode just switched to the counting state to maintain that particular count until application of the next succeeding predetermined electrical input pulse, said switching means further intercoupling said counting groups to momentarily couple said alteration in electrical energy occurring upon advancement of the count to the counting group containing the tunnel diode indicating the immediately preceding count to selectively switch that tunnel diode from the counting state to the inactive state.

14. A pulse counting circuit comprising, in combination: a plurality of counting groups, each group consisting of a plurality of circuit branches connected in parallel, each circuit branch comprising an identical series combination of an electrical isolating device and a tunnel diode, said tunnel diodes being electrically operable through a portion of the negative resistance region of their voltage-current curves between inactive and counting states, each of said counting groups being coupled to a source of direct-current operating potential, the electrical energy supplied to said counting groups from said source of direct-current operating potential normally biasing all except one of said tunnel diodes in the counting circuit in the inactive state; the remaining tunnel diode being biased in the counting state; electrical coupling means connected to the junction between the electrical isolating device and the tunnel diode of each of said circuit branches to intercouple said circuit branches in a counting ring wherein the count progresses successively from group to group in a predetermined order, the junction between the electrical isolating device and the tunnel diode of the Xth circuit branch of one group being coupled by the series combination of rectifier means and resistance means to the junction between the electrical isolating device and the tunnel diode of the Xth circuit branch of the next group, the junction between the electrical isolating device and the tunnel diode of the Xth circuit branch of the last group being coupled by the series combination of rectifier means and resistance means to the junction between the electrical isolating device and the tunnel diode of the $(X+1)$th circuit branch of the first group, said electrical coupling means priming the next tunnel diode to count with an electrical advantage whereby upon application of a predetermined electrical input pulse to the counting groups the primed tunnel diode will be selectively switched from the inactive state to the counting state; and, switching means coupling each of the counting groups to said source of direct-current operating potential, said switching means being responsive to each pulse to be counted by applying a said predetermined electrical input pulse simultaneously to each of said counting groups to thereby cause advancement of the count and by selectively altering the electrical energy supplied to the counting group containing the tunnel diode just switched to the counting state to maintain that particular count until application of the next succeeding predetermined electrical input pulse, said switching means further intercoupling said counting groups to momentarily couple said alteration in electrical energy occurring upon advancement of the count to the counting group containing the tunnel indicating the immediately preceding count to selectively switch that tunnel diode from the counting state to the inactive state.

References Cited in the file of this patent

UNITED STATES PATENTS

| | | |
|---|---|---|
| 2,379,093 | Massoneau | June 26, 1945 |
| 2,644,110 | Desch | June 30, 1953 |
| 2,644,111 | Desch | June 30, 1953 |
| 2,644,112 | Desch | June 30, 1953 |
| 2,714,180 | Manley | July 26, 1955 |
| 2,717,334 | Desch | Sept. 6, 1955 |
| 2,814,762 | Jackson et al. | Nov. 26, 1957 |
| 2,869,035 | Beezley | Jan. 13, 1959 |
| 2,871,408 | Desch | Jan. 27, 1959 |